Aug. 13, 1946. W. G. BETZ Re 22,777
PIANO ACTION
Original Filed July 27, 1940 2 Sheets-Sheet 1
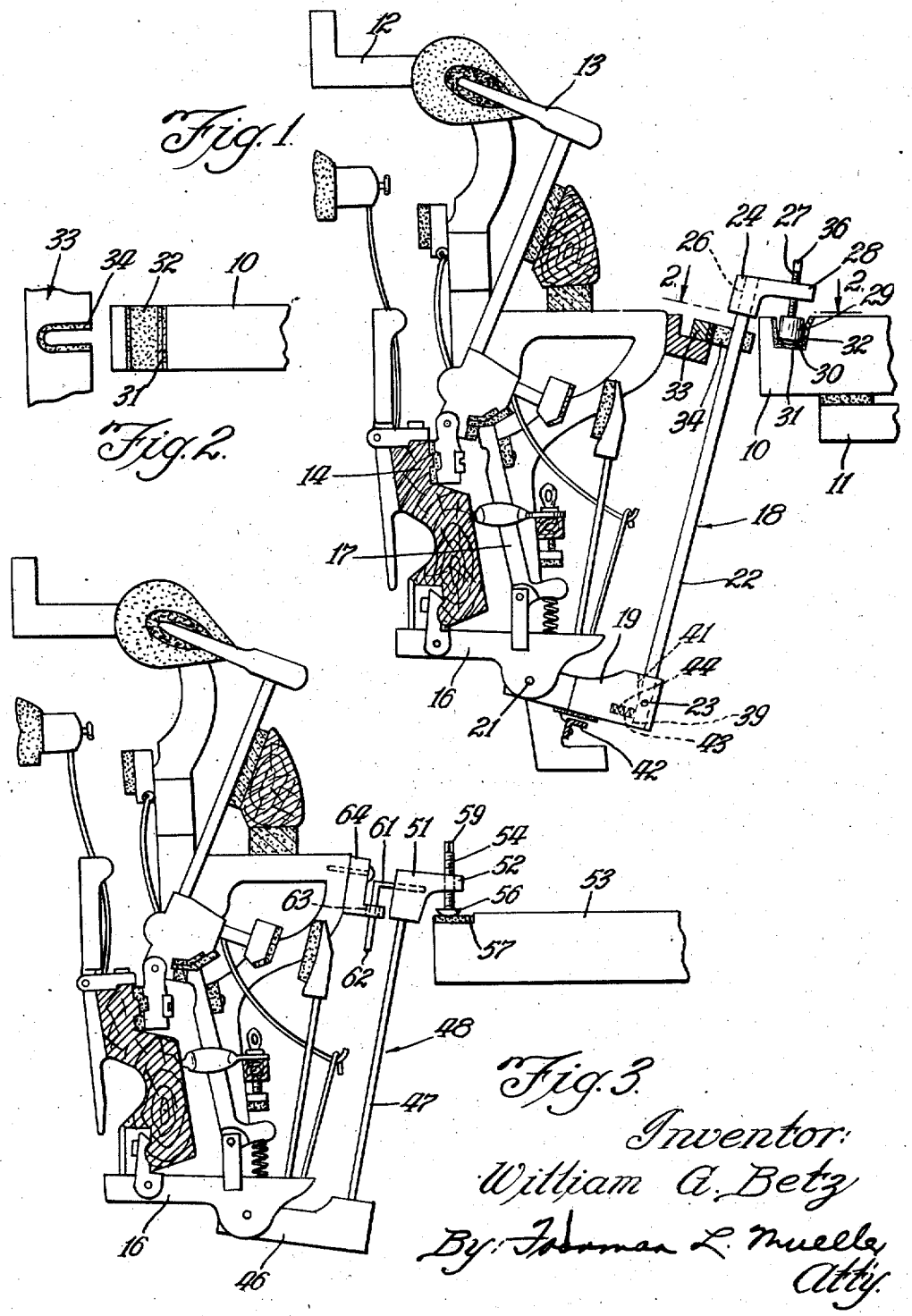

Aug. 13, 1946. W. G. BETZ Re 22,777

PIANO ACTION

Original Filed July 27, 1940 2 Sheets-Sheet 2

Inventor:
William G. Betz
By: Foorman L. Mueller
Atty.

Reissued Aug. 13, 1946 Re. 22,777

UNITED STATES PATENT OFFICE 22,777

PIANO ACTION

William G. Betz, Orlando, Fla., assignor to Pratt, Read & Company, Ivoryton, Conn., a corporation of Connecticut Original No. 2,367,192, dated January 16, 1945, Serial No. 347,877, July 27, 1940. Application for reissue January 15, 1946, Serial No. 641,187

23 Claims. (Cl. 84—240)

My invention relates in general to a piano action, and more in particular to an action of the so-called drop-type for low upright pianos.

Upright pianos that are so low with reference to the portion above the keyboards, that the person playing the piano can easily look over the top, have been known for a great many years. Various drop-type actions have been employed with these pianos, and one of the well-known types has been an action with a substantially freely swingable abstract having an upright body portion of wire, wood, or the like. The upright portion carried a dowel adjacent the top to seat in a well or opening extending downwardly from the top of the key at the rear end portion thereof, with such dowel and seat connecting the abstract and key. The rear end portion of the key was normally slotted from top to bottom, with the slot extending into the key from the rear face thereof and into the center of the well or opening. The abstract upright portion was moved in through the slot until the dowel seated in the well. Although a connection of this type has been used widely for many years, there have been certain difficulties with reference to the same, which the art has been unable to correct. One of the difficulties resulted from the small engaging or connecting surface between the dowel and the annular seat in the well or opening. The slot cut into this seat so that there was little more than a relatively narrow broken ring to engage a similar surface on the lower face of the dowel to transmit the playing force of the key to the action. This small engaging surface reduced the amount of force transmitted from the key through the action somewhat, and this relatively small engaging surface also made it more difficult to maintain a proper adjustment between the key and abstract. Furthermore, in order to provide as large an annular bearing or engaging surface as possible, the slot which extended into the seat was made as narrow as possible. The narrow slot made it difficult on occasion to readily connect or disconnect the abstract upright and dowel with the seat in the key. With the large number of individual action units in the complete action for the piano, it is apparent that a considerable amount of time was sometimes required to assemble or disassemble the action with reference to the keyboard.

In these prior actions the dowel in the key well or opening was not readily accessible for axial adjustment on the upright, so that such an adjusting operation was time consuming and costly. In addition, the small wooden dowel had to be of rather small diameter so that the well or opening in the key would likewise be small, and could be cut into the key without impairing the strength of the key at the rear end portion. Because of the size of the dowels, and the direction in which the grain of the wood in the dowels extended, it was not uncommon to strip the dowel threads as they were screwed onto a threaded wire or rod of the abstract, or when the dowels were being adjusted on such wire or rod relative to the corresponding keys.

In addition to the above problems, the freely swingable abstract would fall forward when the action was disassembled from the key frame, and time was consumed in returning the abstract to upright position.

It is an object of my invention to provide an improved piano action.

A further object is to provide an improved piano action for a low upright type of piano.

Another object of my invention is to provide a simple, inexpensive, and yet sturdy piano action of the low upright type.

A still further object of my invention is to provide an abstract for a piano action of the low upright type which can be manufactured at low cost, and one that will lend itself to ready and low-cost assembly and disassembly in a complete piano.

It is also an object of my invention to provide an abstract for a low upright type of piano action which will efficiently transmit the playing force of a key to a hammer in the action, and will maintain its adjustment relative to the key for proper playing position at all times.

Another object of my invention is to provide an improved piano action for a low upright type piano in which a freely swingable abstract is retained at a substantially normal operating position on disengagement thereof from its corresponding key.

Features of my invention reside in the provision of a drop-type piano action which transmits efficiently the playing force on the keys, is subject to easy adjustment, and can be readily assembled and disassembled with reference to a keyboard.

A still further feature of my invention is the provision of abstract structure for the low upright type of piano action with an inverted adjusting member having a large bearing surface for directly transmitting the key movement to the abstract, and an associated guide opening to maintain the abstract centered with reference to the key.

Another feature of my invention is the provision of a piano action of low upright type having an abstract structure composed of simple parts, which can be manufactured and assembled with low tooling and manufacturing cost.

Yet another feature of my invention is the provision of a piano action of low upright type having an upright abstract and associated structure for maintaining the abstract upright when the action is disconnected from the keyboard.

Other objects and features of my invention will be apparent from the following description taken with the drawings, in which:

Fig. 1 is an elevation partly in cross-section of one of the units of a complete piano action comprising one of the embodiments of my invention;

Fig. 2 is a detail view partly in cross-section, showing particularly the recessed portion at the rear end of a playing key and the arrangement of an abstract guide member relative to such key;

Fig. 3 is an elevation illustrated similarly to Fig. 1 showing a modified form of my invention;

Figure 4:
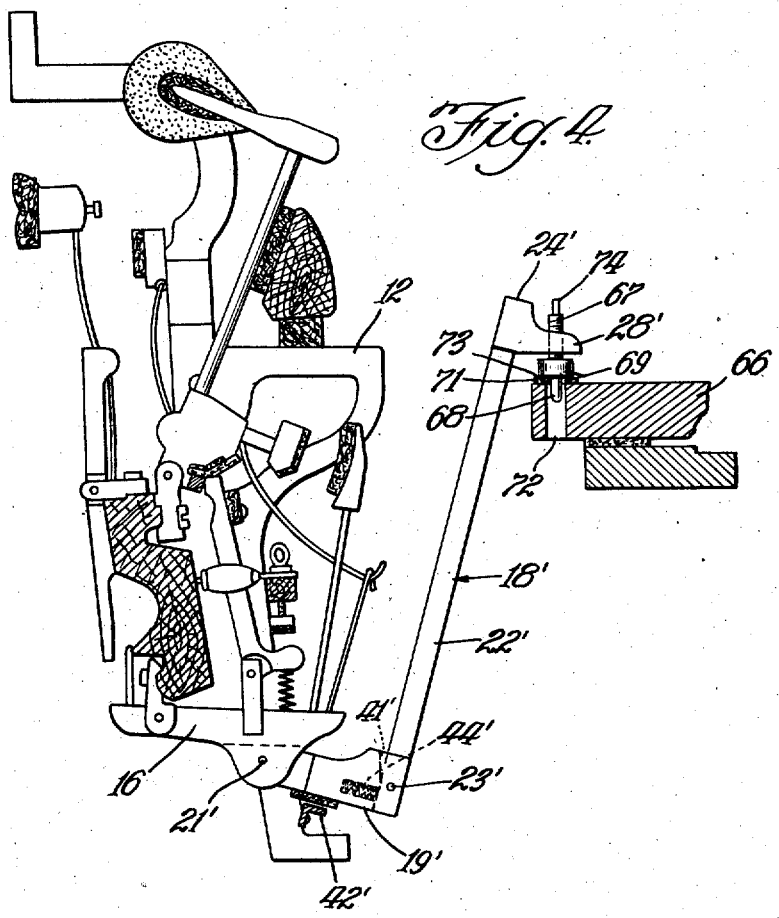
Fig. 4 is a view illustrated similarly to Fig. 1 showing another modification of my invention.

In practicing my invention I provide a piano action of low upright type having a bracket, a hammer or striking means, a whip or pivotal means, and structure intermediate the two, all of substantially standard construction. The movement of the key is transmitted to the whip or pivotal means by an abstract means having an upright body portion for pivotal connection to the whip, and a head portion above the level of the keys, with an extension projecting forwardly over the rear end of the key. An inverted adjustable unit is mounted on the head portion of the abstract, and has a portion which projects downwardly from the head portion into operative engagement with a corresponding engaging portion at the rear end of the key. My invention contemplates further the provision of means for centering the abstract head portion with reference to the key, and means for retaining the abstract in a substantially upright position on relative movement of the adjustable unit and key from their engaged position.

Referring to the drawings, similar numerals of reference shall designate similar parts throughout the several views.

A single action unit in the complete action for a piano is illustrated in Fig. 1 with a fragmentary illustration of the key and supporting structure for the keyboard. A key 10 in the complete keyboard is mounted in the usual manner upon a keybed or frame 11. Movement of the key is transmitted to an action supported upon a bracket 12 suitably secured in the piano case. The action includes a hammer 13 supported on an action rail 14, and a whip 16 pivotally supported on the same rail to raise a jack or fly 17, which is pivotally supported on the whip. Suitable stops and checks are likewise provided in the action for the several members mentioned.

The pivotal movement of the key 10 is transmitted directly into the action and to the hammer 13 by an abstract 18 which includes a foot member or mounting portion 19 pivotally connected to the whip 16 at 21, and an upright connecting or body portion 22 pivotally connected to the foot portion at 23, the connections 21 and 23 being arranged in substantial longitudinal alignment at opposite ends of the mounting portion 19. The upright or body portion of the abstract extends upwardly from the mounting portion to a point above the level of the key 10 to connect with a head member or portion 24 for the abstract. Body portion 22 may comprise a wood stock which is glued, or otherwise fixedly secured in a bore 26 in the head 24, or it may likewise consist of a metal rod or wire which is threadably or otherwise connected with the head 24 at the bore 26 so that the head is rigid on the body portion. The abstract is substantially freely swingable in a vertical arcuate path in alignment with the key 10 and in order to connect the key and abstract, and retain the same in connected position during playing, an adjusting unit 27 including an inverted screw is threadably secured in the front or lip portion 28 of the head 24 overhanging the rear end of the key, and projects downwardly therefrom.

In this illustrated embodiment of the invention, the screw 27 comprises a standard round or swaged head regulating screw having a round button or dowel 29 threadably secured at its lower end. Dowel 29 is of substantial diameter and has a corresponding bottom engaging portion 30 to provide a satisfactory bearing surface with a bushing 31 of felt or other material which lines a transverse slot or opening 32 formed at the rear end of the key 10. The engaging face is slightly curved to correspond with and facilitate the slight rocking action at the bushing as the key is pivoted and the abstract lifted in the normal playing operation of the piano. The wooden engaging face 30 of the dowel bears directly against the bushing, but if desired, a leather or felt tip may be employed for this engagement.

As clearly indicated in Figs. 1 and 2, the opening 32 extends transversely entirely across the key 10 and is of substantially trough shape, the side walls of the trough diverging slightly outwardly from each other to accommodate the slight relative movement which occurs between the key and the dowel 29 during playing operation of the piano. The divergence is primarily at the top of the opening 32 and the sides of the dowel 29 bearing against the sides of the opening 32 maintain the abstract head centered in a direction longitudinally of the key. The connection between the abstract head portion 24 and the key 10 thus provides for a large bearing surface between these parts to efficiently transmit the playing blow on the key to the hammer 13 without weakening the key or abstract structure in any way, and assists in maintaining the abstract head port on centered or fixed with reference to the key. Further, the opening or trough 32 is readily formed by cutting an entire keyboard in a single operation, before the individual keys are cut out of the wood from which the keyboard is made. Manufacturing costs of the improved structure are thus reduced to a minimum.

Screw 27 is maintained definitely centered with reference to the key 10 by means of a guide rail or member 33 which is supported on the mounting bracket 12. The guide member 33 is formed with a guide opening 34 which is of elongated form and lined with a suitable bushing or felt or like material. Similar guide openings are provided for the other abstracts in the complete piano action. The opening 34 is in longitudinal alignment with the key 10 and is positioned in close proximity to the head portion 24. With the head portion 24 and key 10 in the position indicated in Fig. 1, the abstract body portion 22 extends through the guide opening 34 and is freely movable therein between the side walls of the opening for all operating positions of the key and abstract, although prevented from side movement relative to the key so that the dowel or button 29 is maintained centered in the transverse opening 31. It is readily apparent that the opening 34 is of sufficient length and in sufficient proximity to the key 10 to prevent the abstract body portion 22 from slipping or falling out of the opening during normal operation of the piano action.

Relative vertical adjustment between the key and abstract head 24 which, of course, governs the relative position of the entire abstract with reference to the key, is accomplished by rotating the screw 27 at the head 36 on the screw. The threaded connection between the screw and abstract head 24 is such that the rotation of the screw and the head is easily accomplished and yet there is sufficient friction so that the screw maintains any desired adjusted position in the head 24. The screw head 36 is readily available to an operator assembling the keyboard and action in the piano casing, and is just as readily available for adjustment to a tuner or repair man, working on the action after the piano is completed. Furthermore, with the head 24 of the abstract entirely above the level of the keys, each of such heads in the complete piano action can be easily grasped to connect or disconnect a screw 27 with the key.

Figure 5:
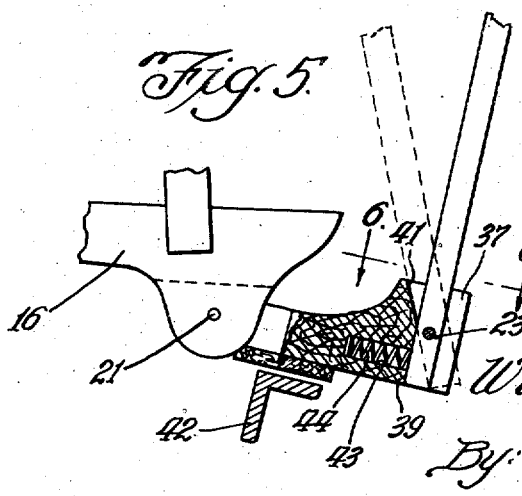
Fig. 5 is an enlarged fragmentary view with parts removed therefrom for the purpose of clarity, showing the spring for retaining an abstract in a substantially upright position on its disengagement from its corresponding key.
Figure 6:
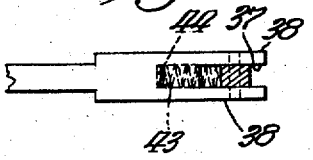
Fig. 6 is a fragmentary sectional view as seen along the line 6—6 in Fig. 5.

As was previously mentioned the abstract mounting portion 19 has its opposite ends pivotally connected at 21 and 23 to the whip and abstract body portion 22, respectively. The mounting or foot portion 19 at the connection 23 is of bifurcated structure, the lower end of the abstract body portion 22 being positioned in the slot 37 formed between the bifurcations 38 (Figs. 5 and 6). The inner end of the slot 37 is of straight contour over the portion 39 below the pivotal connection at 23 and is slanted or angularly relieved over the remainder of its length as indicated by reference 41. The body portion 22 is thus swingable relative to the foot member 19 about the pivot point 23 between the angular limits defined by the straight portion 39 and the slanted portion 41. During normal operation the portion 22 is in a position adjacent the straight line limit as indicated in Figs. 1 and 5. On disengagement of the projecting portion of the adjusting unit 27 from the key 10, in a usual manner, the abstract body portion 22 and the leg 19 tend to move as a unit about the pivotal connection 21 until the leg 19 contacts the holding or rest rail 42, which is supported on the mounting bracket 12. The position of the rest rail 42 is such that the body portion 22 will not fall out of the guide opening 34. However, to facilitate replacement and removal of the keys 10 on and off the keyboard 11, the straight portion 39 of the slot 37 is provided with a bore or cavity 43 for a coil spring 44. The spring is arranged in compression in the cavity by abutment against the lower extremity of the body portion 22. The pressure exerted by the spring thus acts to turn the body 22 in a counter-clockwise direction about the pin 23 as seen in Figs. 1 and 5. This action moves the head portion 24 in a direction away from the key 10 and toward the guide member 33, the extent of this movement being limited by the engagement of the body portion 22 with the slanted wall portion 41 in the leg member 19. Removal of the key is thus a relatively simple matter since on removal of the button 29 from the transverse slot 32, the head portion 24 is immediately moved and held away from the key 10 by the action of the spring 44. The pressure of the spring 44, however, is relatively small, so that although this pressure is continuously applied against the body portion 22, the abstract 18 is freely movable at all times relative to the key 10 and whip 16 during the normal operation of the piano action. With this construction the abstracts are prevented at all times from falling forward, the assembly and disassembly of the action and keys is facilitated, and the action can be freely moved about and shipped without the abstract falling forward and complicating handling.

A modified form of the invention is shown in Fig. 3. The foot or mounting portion 46 on the body portion 47 for the abstract 48 is pivotally connected at one end to the whip 16. The upper end of the upright or body 47 is connected with a head portion 51. The body 47 may consist of a metal rod or wire which is threadably connected with the head 51 and foot portion 46 to provide for a relatively rigid abstract structure, or a wooden member may be employed as illustrated in Fig. 1.

Head portion 51 is formed with a front lip portion 52 which overhangs the rear of the key 53, the key and head portion being in operative connection by means of an adjusting unit 54 comprising a downwardly projecting screw which is threadably secured to the lip 52. The screw 54 corresponds substantially to a standard capstan and is arranged in an inverted position so that its arcuate head portion 56 is in abutting engagement with a felt bushing 57 at the rear end of the key. The arcuate head portion 56 is of sufficient size to provide a good bearing surface with the felt bushing 57 and corresponds with and facilitates the slight rocking action at the bushing as the key is pivoted and the abstract lifted in the normal playing operation of the piano. Relative vertical adjustment between the key and abstract head 51 is accomplished by rotating the screw 54 at the head 59 in a threaded bore in the abstract head 51.

Screw 54 is centered with reference to the key 53 by means of a right-angled pin 61 mounted in the head 51 and having a downwardly extending portion 62 projecting through a guide opening 63 formed in a guide rail 64 which is supported on the mounting bracket 12. Opening 63 is provided with a bushing of felt or other material, the projecting pin 62 being centered in an aperture formed in the bushing. There is enough body in the material of the bushing so that the aperture therein retains substantially its original shape throughout a normal life of the piano in which the action is employed. The bushing gives slightly at the aperture so that there is no undesirable binding on the pin. On disengagement of the screw 54 and the key 53 the abstract 48 is prevented from falling forward into the key zone by the engagement of the pin portion 62 in the guiding hole 63.

A further modification of the invention is illustrated in Fig. 4. The foot portion 19′ of abstract 18′ is pivotally connected at 21′ to the whip 16 and at 23′ to the lower end of the abstract upright or body portion 22′. The upper end of portion 22′ extends upwardly above the level of key 66 to connect with a head member or portion 24′ for the abstract. As is evidenced from Fig. 4, the upright 22′ comprises woodstock which is glued or otherwise fixedly secured to the head portion 24′. The entire foot portion 19′, the body portion 22′, and the pivoting and connecting structure therefor, can be identical with the corresponding structure of Fig. 1.

An adjusting unit 67 including an inverted screw is threadably secured in the front or lip portion 28′ of the head 24′ overhanging the rear end of the key. In the illustrated embodiment of the invention, the screw 67 comprises a substantially standard regulating screw, with the lower end 68 of the screw ground to remove the usual threads. That is, the portion extending into an opening in the key, as will be described, is smooth. An enlarged annular surface for operative engagement with the key is provided at the lower extremity of the threaded portion of the screw by means of a dowel 69 or similar element, rigidly secured on the screw. The dowel 69 is of substantial diameter and sufficient to provide a good bearing surface at its lower face between the bushing 71 on the key and the screw so as to efficiently transmit the playing force from the key to the action. The shoulder or bearing surface on the member 69 may be of slightly rounded contour to facilitate the pivotal action of the key 66. The abstract head is centered with reference to the key by a substantially oval opening 72 in the end portion of the key receiving the projecting or pin portion 68 of the screw. In order to provide for the slight relative movement of the key 66 and screw 67, represented by the rocking action therebetween, the bore or opening 72 extending vertically through the key at the rear end portion in substantially oval in a direction longitudinally of the key and is slightly larger than the projecting portion 68 of the screw 67. However, the screw 67 is maintained in a centered position with reference to the bore or opening 72 by means of an aperture 73 in the felt bushing 71, which aperture corresponds with the circumference of the end portion 68 of the screw.

Vertical adjustment between the key 66 and the abstract head portion 24' is obtained by manipulation of the screw 67 and the head portion 74 formed thereon. As in the previous embodiments an adjusted position of the screw 67 is maintained by virtue of the threaded connection between the screw and the head portion 24'.

On disengagement of the screw 67 from the key 66, the foot portion 19' and connected whip fall forward until engagement is made with the rest rail 42'. The abstract 18', however, is prevented from falling forward by virtue of the spring 44' which is located in the mounting portion 19' in operative engagement with the upright member 22' and in a manner to move the head portion 24' in a direction away from the key 66 and toward the mounting bracket 12. Since the structure and operation of the spring 44' and mounting portion 19' is similar in all respects to that previously described in connection with the spring 44 and mounting portion 19 of the embodiment shown in Figs. 1 and 2, a further description thereof is believed to be unnecessary.

From the above description it is apparent that the present action provides a simple, sturdy structure which may be produced at low cost and can be easily assembled into a complete piano structure so that the assembly costs are maintained at a minimum. In all of the three illustrated embodiments of the invention substantial bearing surface is provided intermediate the abstract and key so that the full playing force on the key is transmitted to the whip 16 and up to the hammer 13. There are, of course, frictional losses in the action just as there are in any piano action, but the present construction reduces these losses to a minimum. With the movement of the key being transmitted through an inverted adjusting unit or screw threadably secured in the abstract head, adjustment of the screw can be made simply and quickly from the top of the action. The action support and other action elements are all rearwardly of the adjusting unit so that there is nothing to interfere with ready adjustment by the workman in the factory, or the piano tuner, after completion of the piano. Similarly, with the action supporting portion of the bracket entirely rearwardly of the key and abstract heads, the keyboard can be readily and easily removed from the action. The abstract head is guided or centered with reference to the key by a downward projection from the head and a corresponding opening in either the key or guide rail, with the weight of the abstract and action maintaining a centering connection in a very simple manner. Furthermore, the action of my invention provides for a retention of the abstract away from the zone of the keys on their disengagement from the keys, whereby to facilitate assembly and service work on the keys and on the action, and such retention likewise facilitates shipping and other handling of the action.

Although my invention has been illustrated in several embodiments, it is understood that it is not to be so limited, but is to be limited only by the scope of the appended claims.

I claim:

1. In a piano structure, the combination of a key member, and an action operatively connected to said key member, said action including an abstract having an upright body portion, a head member on said body portion overhanging the rear end portion of the key member and spaced vertically from the top surface of the key member, means operatively connecting the head member and key member including a substantially upright unit on one of said members projecting into a corresponding opening in the other of said members, with said opening in said other member extending transversely entirely across said member, and means mounted in the action guidably acting upon the abstract body portion and maintaining the substantially upright unit against movement longitudinally of the transverse opening, with the playing movement of the key being transmitted to the action through said unit.

2. In a piano structure including in combination, an action having supporting bracket means therefor entirely rearwardly of the rear ends of the keys for the piano structure, a striking member in said action, a plurality of keys and each of said keys having an opening in the rear end portion thereof, means for transmitting motion from a key to the striking member including an abstract having a substantially upright body operatively connected with the striking member, a head portion at the upper end of said body having an extension overhanging the rear end of the key, a threaded member mounted in said extension having an adjusting portion above said extension, and an engaging portion projecting downwardly below the extension for operative engagement with the key, and means for centering the abstract head portion with reference to the key including said operative engagement between said projecting engaging portion and key opening and a rail supported on said bracket means, said rail having a guide opening therein and with said upright body extending through said guide opening and movable up and down therein.

3. In a piano structure, the combination including a key with an opening extending transversely across the rear end portion thereof, an action having bracket means for supporting said action, said bracket means being arranged entirely rearwardly of the rear end of said key, means in the action for operatively connecting said key to said action in a guided connection including an abstract having an upright body, a head mounted on said body having an extension overhanging the rear end of the key and spaced upwardly therefrom, adjustable means connecting said key and abstract head having a portion mounted in said head and projecting therefrom downwardly into the opening in the key, an operating portion on said projecting portion operatively engaging said key at said opening to receive the playing force of the key, and stationary guiding means centering said adjustable means with reference to said key, supported on said bracket means rearwardly of the abstract body, and having an opening therein at a point below the level of the abstract head and surrounding said body on at least three sides.

4. In a piano structure having keys and an action with supporting bracket means therefor entirely rearwardly of the rear ends of the keys for the piano structure and a pivoted whip in said action, the combination of means for transmitting motion from the key to the whip including an abstract pivotally connected at one end to said whip, said abstract having a head at the other end thereof, with a portion overhanging the rear end of the keys, adjustable means on said portion operatively connectible with the key for varying the spacing between said portion and the key, and means for centering the abstract head with reference to the key including a guide member supported on said supporting bracket means, said member having a guide opening therein, and a pin portion on said head portion extending rearwardly and downwardly from said head portion into said opening.

5. In a piano structure having a key and an action having supporting bracket means and a pivoted whip corresponding to a key for the piano structure, the combination of means for operatively connecting the key and whip including an upright member pivotally connected at the bottom thereof to said whip and having a head portion at the top, an inverted adjusting member supported in the overhanging portion of the head portion and extending downwardly from said overhanging portion to operatively engage the rear end portion of the key, and means for maintaining said head portion substantially centered with reference to the rear end of the key including a stationary rail supported on said bracket means rearwardly of the upright member having a guide opening therein, with said upright member operatively connected with the guide opening and slidable in an up and down movement relative thereto.

6. In a piano action with a whip and supporting bracket means with the latter adapted to be mounted in a piano entirely rearwardly of the keys for the piano, the means for operatively connecting a key and whip including an upright member having a head portion and a foot portion at opposite ends thereof, said head portion having a lip extending forwardly over the rear end of the key in operative engagement with said key, axis means pivotally connecting one end of said foot portion near the lower end of said upright member, second axis means pivotally connecting the other end of said foot portion to said whip, and resilient means mounted in said foot portion below said first axis means in operative engagement with said lower end of the upright member, said resilient means acting on said upright member to pivot the same about said first axis means to continuously urge said head portion toward said bracket means so that the upright member is retained near said bracket means on relative movement of said head portion and key out of an operatively connected position.

7. In an action for a piano having keys, means for operatively connecting said action to a key, including an abstract normally swingable about a transverse axis at the bottom thereof and adapted to fall forwardly upon disconnection from a key, said abstract including an upright member, a foot portion, axis means pivotally connecting said foot portion into said action at one end of said foot portion, a second axis means pivotally connecting the other end of said foot portion and the lower end of said upright member, a spring mounted in said foot portion bearing against said upright member below the second axis means to pivot said upright portion about said second axis means and continuously urge the abstract above said second axis means toward the action when the abstract is disconnected from the key to prevent the abstract from falling forward.

8. In a piano action having supporting bracket means therefor adapted to be mounted entirely rearwardly of the rear end of a key for a piano, and including the combination of means for transmitting motion from a key, including an abstract, said abstract having a head portion at one end thereof with a lip portion adapted to overhang the rear end of a key, a threaded member mounted on said lip portion having an adjusting portion above said lip portion, and an engaging portion below the lip portion for operative engagement with a key, and means for centering the abstract head portion with reference to a level of the key including a downwardly extending pin portion extending below the level of the engaging portion and into a corresponding guide opening which extends below the level of the top surface of a key.

9. In a piano action having supporting bracket means therefor adapted to be mounted entirely rearwardly of the rear end of a key for a piano, the means for transmitting motion form the key including an abstract, said abstract having a head portion with a lip portion adapted to overhang the rear end of a key, a member mounted on said lip portion and having an engaging portion below the lip portion for operative engagement with the key, and means for centering the abstract head portion with reference to the key including a pin portion extending downwardly from said head portion and into a corresponding guide opening extending below the level of said engaging portion.

10. In a piano including key means and bracket means, with one of said two means having an abstract centering opening therein, and said piano including an action supported on said bracket means, the means in said action for transmitting the playing movement of the key into the action including an abstract having a body entirely rearwardly of the rear end of the key means, pivotal axis means at the lower end of the body pivotally connecting said abstract into said action, a head at the top of said abstract having a portion overhanging the rear end of the key means and spaced vertically from the top surface thereof, with said overhanging portion being entirely forwardly of said bracket means, means on said abstract head for operatively connecting said abstract head and key means including an adjustable means having a portion threadably secured in the overhanging portion of said abstract head, said adjustable means having a bearing portion for direct connection with the key means and being adjustable from above said overhanging portion of the abstract head, and a downward projecting portion on said abstract head extending into said centering opening in centered relation thereto.

11. In a piano having key means, the combination of a piano action including a whip corresponding to each key in said key means, a substantially upright abstract rearwardly of the rear end of a key, axis means pivotally connecting the whip and the abstract, said abstract having a head unit with a portion overhanging the rear end of the key and including an adjustable means having a portion threadably secured in said overhanging portion, with said adjustable means being adjustable from above said overhanging portion and having an engaging portion for direct bearing engagement with the key, bracket means mounted in the piano supporting said action, with one of said key and bracket means having an abstract centering opening therein, with said abstract head unit having a portion extending downwardly to a point below the level of the top of said key into said centering opening, and the action supporting portion of the bracket means being positioned entirely rearwardly of the rear end of the key means so as to be entirely out of the way for disconnection and connection of the keys and action.

12. In a piano action having supporting bracket means therefor entirely rearwardly of the rear end of the key for the piano and a pivoted whip in said action, the means for transmitting motion from the key to the whip including an abstract pivotally connected at one end to said whip, said abstract having a head portion at the other end thereof, with a lip portion overhanging the rear end of the key, a member mounted on said lip portion and having an engaging portion below the lip portion for operative engagement with the key, and means for centering the abstract head portion with reference to the key including a pin portion extending downwardly from said head portion and into a corresponding guide opening extending substantially below the level of said engaging portion.

13. A piano action comprising in combination with a key and a hammer actuated thereby, means operatively connecting the hammer to the key including an abstract, said abstract comprising an upright rigid body disposed behind the key and having a forwardly projecting head unitary therewith and overlying the rear portion of the key, said rigid body being supported only by a pivotal connection with the hammer mechanism and a connection with the key, said key connection comprising a member threaded through said head and having a firm pivotal lost motion connection with the key, and means for providing a connection between said threaded member and the key, said last-named means comprising an extension on said threaded member, and an opening in the key to receive the extension and a bearing portion on the threaded member above said extension all of which will permit positive transmission of force from the key in a substantially vertical plane while insuring against relative slippage between said parts in other planes.

14. A piano action comprising in combination with a key and a hammer actuated thereby, said key having a recess in the upper rear portion thereof, means operatively connecting the hammer to the key including an abstract, said abstract comprising an upright rigid body disposed behind the key and having a forwardly projecting head unitary therewith and overlying the rear portion of the key, said rigid body being supported only by a pivotal connection with the hammer mechanism and a connection with the key, said key connection comprising a stud threaded through said head and having a bearing element spaced from the lower end thereof and a perforated cushion seated over the recess in said key, said bearing element engaging said cushion and the lower end of said stud extending therethrough so as to provide a firm pivotal lost motion connection between the abstract and the key.

15. In a piano action having supporting means therewith and adapted for connection with a piano key, the combination including an abstract of a length to extend below the level of a key when connected therewith and having a head portion with a forward extension, adjustable means in the forward extension extending downwardly therefrom for operative connection with a key, and means for maintaining said adjustable means in said extension substantially centered relative to a key including a stationary rail mountable on the piano action supporting means rearwardly of the abstract and having a guide opening therein, with said abstract operatively connected with the guide opening and movable in an up and down movement relative thereto.

16. In a piano action having supporting means therewith and adapted for connection with a piano key, the combination including an abstract of a length to extend below the level of a key when connected therewith and having a head portion for connection with a key, a guide member on the head portion rearwardly thereof, and means cooperating with said guide member for maintaining said head portion centered relative to a key including a rail mounted on the supporting means rearwardly of the head portion having a guide opening therein receiving said guide member for guided up and down movement of the abstract.

17. In a piano action adapted for connection with a piano key, motion transmitting means having a body portion with a head at the top thereof adapted to be operatively connected with a key, means at the bottom of the body portion, axis means connecting said body portion and bottom means so that they are pivotal relative to one another, and resilient means on said motion transmitting means operatively connecting said body portion and bottom means and acting when the head is disconnected from a key to pivot the body portion around said axis means toward the remainder of the action and away from a key.

18. In a piano action capable of being moved in and out of a piano as a complete unit assembly, having supporting means therewith and being adapted for operative connection with piano keys in a piano, such action including in combination a hammer, intermediate means for operating the hammer, an abstract for operating the intermediate means adapted to be positioned rearwardly of a key when the unit assembly is mounted in a piano and of a length to extend below the level of a key thereof, said abstract having a lip portion overhanging the rear end of the key for operative connection therewith, rail means mounted on the supporting means in the unit assembly and to the rear of the abstract, said rail means having an opening therein at a level below the lip portion of the abstract but nearer the top than the bottom of said abstract, and a projecting portion on the abstract extending rearwardly and downwardly at the back thereof with a part of said projecting portion in the opening in the rail means to cooperate therewith in maintaining the abstract upright and preventing it from falling away from the remainder of the action upon removal away from the keys of the action as a complete unit assembly.

19. In a piano action capable of being moved in and out of a piano as a complete unit assembly having hammers and intermediate operating mechanisms and having supporting structure therewith, such action being adapted for operative connection with piano keys in a piano, the combination in said action including abstract means acting on said intermediate operating mechanism adapted to be positioned rearwardly of a key when the unit assembly is mounted in a piano and of a length to extend below the level of a key when connected therewith, said abstract means having a pivotal connection adjacent the bottom and having a lip adjacent the top overhanging the rear end of the key for operative connection therewith, rail means mounted on the supporting structure and positioned laterally of the abstract means below the level of the top of the abstract means, one of said means having an opening therein and the other means having a substantially L-shaped portion with one part of the L-shaped portion extending into the opening and the other part of the L-shaped portion spacing the first part from said other means, and said substantially L-shaped portion and the edge of said opening cooperating to maintain the abstract means upright and prevent it from falling away from the remainder of the action upon removal away from the keys of the action as a complete unit assembly.

20. In a piano action having hammers and intermediate operating mechanism all being movable in and out of a piano as a complete unit assembly and being adapted for mounting in a piano for operative connection with the keys thereof, said action including in combination abstract means for operating a corresponding intermediate mechanism and which when mounted in a piano is positioned rearwardly of a key and is of a length to extend below such key, said abstract means having a pivotal mounting at the bottom part and at the top part having a lip overhanging the key, rail means mounted in the action and positioned laterally of the abstract means below the level of the top thereof but nearer the top than the bottom thereof, one of said means having an opening therein and the other of said means having an L-shaped hook secured therein and including a part extending into the opening of said one means, said L-shaped hook and the edge of said opening cooperating to maintain the abstract means upright and prevent it from falling away from the remainder of the action in a pivotal movement upon removal of the action away from the piano keys, as a complete unit assembly.

21. In a piano action having hammers and intermediate operating mechanism all being movable in and out of a piano as a complete assembly unit and being adapted for operative connection with the keys thereof, said action including in combination an abstract adapted to be positioned rearwardly of a key when the unit assembly is mounted in a piano and of a length to extend below the level of a key, said abstract having a pivotal connection at the bottom part and having a forwardly extending portion at the top part overhanging the rear end of a key for operative connection therewith, means in the action having an opening lower than the level of the top part of the abstract and laterally of the abstract, and a portion on the abstract projecting laterally thereof and downwardly, with the downward part terminating below the lateral part and one part positioned in the opening to move up and down in said opening relative thereto when playing the piano, with said projecting portion and the edge portion of the opening acting to retain the abstract in an upright position when the piano action is operated and retain it against falling forwardly when the piano action is removed from the piano as a complete unit assembly.

22. In a piano having keys and unit-assembly operating apparatus including whips located below the level of said keys, the mechanism in said unit assembly operating apparatus including in combination means for transmitting the movement of a key to a corresponding whip and means guiding said transmitting means while it is in playing connection with the key and retaining the same against falling forwardly when the key and the unit assembly operating apparatus are separated, said transmitting means comprising an abstract having means fastening it to a corresponding whip in the unit apparatus, having a body positioned rearwardly of the key, and having an engaging portion extending forwardly to overlie the end of a key, and said guiding and retaining means comprising guide rail means having a guide opening therein corresponding to the abstract and positioned below the level of the top thereof and comprising a rigid laterally and downwardly projecting portion on the abstract having a part thereof in the guide opening and movable therein, with such projecting portion terminating in a short length below the level of the opening.

23. In a piano action for operative connection with piano keys and adapted to be moved in and out of, and mounted in a piano as a complete unit assembly, the combination including abstract means having the body thereof adapted to be positioned rearwardly of a corresponding key when the action is mounted in a piano and of a length to extend below the level of such key, said abstract means having a pivotal connection at the bottom part for connecting it into the action and having at its top part a forward extension overhanging the rear end of such key for operative connection therewith, cooperating means in the action which is lower than the level of the forward extension but adjacent thereto and which is positioned laterally of the abstract body, with one of said two means including an opening therein and the other of said means having a portion in a substantially L-shaped configuration with a terminated part thereof extending downwardly, being in said opening, and remaining therein upon up and down movement of one of said means when the piano action is operated upon playing the piano.

WILLIAM G. BETZ.